US008019875B1

(12) United States Patent
Nielsen

(10) Patent No.: US 8,019,875 B1
(45) Date of Patent: Sep. 13, 2011

(54) SYSTEMS AND METHODS FOR INDICATING A USER STATE IN A SOCIAL NETWORK

(75) Inventor: Thomas Alan Nielsen, Newark, CA (US)

(73) Assignee: Google Inc., Mountain View, CA (US)

( * ) Notice: Subject to any disclaimer, the term of this patent is extended or adjusted under 35 U.S.C. 154(b) by 1262 days.

(21) Appl. No.: 10/861,031

(22) Filed: Jun. 4, 2004

(51) Int. Cl.
*G06F 15/16* (2006.01)
*G06F 15/173* (2006.01)

(52) U.S. Cl. ........................................ 709/227; 709/226
(58) Field of Classification Search .................. 709/227, 709/226
See application file for complete search history.

(56) References Cited

U.S. PATENT DOCUMENTS

| | | | |
|---|---|---|---|
| 5,287,498 A | 2/1994 | Perelman et al. | |
| 5,537,586 A | 7/1996 | Amram et al. | |
| 5,796,393 A | 8/1998 | MacNaughton et al. | |
| 5,950,200 A | 9/1999 | Sudai et al. | |
| 5,963,951 A | 10/1999 | Collins | |
| 6,041,311 A | 3/2000 | Chislenko et al. | |
| 6,052,122 A | 4/2000 | Sutcliffe et al. | |
| 6,061,681 A | 5/2000 | Collins | |
| 6,073,105 A | 6/2000 | Sutcliffe et al. | |
| 6,073,138 A | 6/2000 | de l'Etraz et al. | |
| 6,092,049 A | 7/2000 | Chislenko et al. | |
| 6,256,648 B1 | 7/2001 | Hill | |
| 6,285,999 B1 | 9/2001 | Page | |
| 6,327,590 B1 | 12/2001 | Chidlovskii | |
| 6,366,962 B1 | 4/2002 | Teibel | |
| 6,389,372 B1 | 5/2002 | Glance | |
| 6,421,678 B2 | 7/2002 | Smiga et al. | |
| 6,442,567 B1 | 8/2002 | Retallick et al. | |
| 6,594,673 B1 | 7/2003 | Smith | |
| 6,658,423 B1 | 12/2003 | Pugh et al. | |
| 6,665,715 B1 | 12/2003 | Houri | |
| 6,678,681 B1 | 1/2004 | Brin | |
| 6,782,425 B1 * | 8/2004 | Germscheid et al. | ......... 709/227 |
| 6,799,176 B1 | 9/2004 | Page | |
| 6,834,195 B2 * | 12/2004 | Brandenberg et al. | ..... 455/456.3 |
| 6,837,436 B2 | 1/2005 | Swartz et al. | |

(Continued)

FOREIGN PATENT DOCUMENTS

CN 1949220 A 4/2007

(Continued)

OTHER PUBLICATIONS

Adamic, Lada et al., Web Site, "A Social Network Caught in the Web," http://firstmonday.org/Issues/issue8_6/adamic/, printed Jul. 28, 2004.

(Continued)

*Primary Examiner* — Tonia L. M. Dollinger
*Assistant Examiner* — Mark D Fearer
(74) *Attorney, Agent, or Firm* — Fenwick & West LLP

(57) ABSTRACT

Methods and Systems for determining a user state for a member of a social network are described. According to one embodiment, a method comprising receiving in a network of associated users user state information for a first user, wherein the network of associated users comprises user established relationships between users, determining a current user state for the first user; and outputting to a second user the user state information based at least in part on the current user state and a relationship based permission status is set forth.

36 Claims, 3 Drawing Sheets

U.S. PATENT DOCUMENTS

| | | |
|---|---|---|
| 6,865,546 B1 | 3/2005 | Song |
| 6,871,186 B1 | 3/2005 | Tuzhilin et al. |
| 6,895,406 B2 | 5/2005 | Fables et al. |
| 6,912,505 B2 | 6/2005 | Linden et al. |
| 7,013,292 B1 | 3/2006 | Hsu et al. |
| 7,069,308 B2 | 6/2006 | Abrams |
| 7,080,117 B2 | 7/2006 | De Pinto |
| 7,092,821 B2 | 8/2006 | Mizrahi et al. |
| 7,110,983 B2 | 9/2006 | Shear |
| 7,113,917 B2 | 9/2006 | Jacobi et al. |
| 7,117,254 B2 | 10/2006 | Lunt et al. |
| 7,130,777 B2 | 10/2006 | Garg |
| 7,130,844 B2 | 10/2006 | Elder et al. |
| 7,139,252 B2 | 11/2006 | Babu et al. |
| 7,177,904 B1 | 2/2007 | Mathur et al. |
| 7,188,153 B2 | 3/2007 | Lunt |
| 7,225,249 B1 * | 5/2007 | Barry et al. ............ 709/227 |
| 7,234,117 B2 | 6/2007 | Zaner |
| 7,246,164 B2 | 7/2007 | Lehmann |
| 7,269,590 B2 | 9/2007 | Hull |
| 7,275,068 B2 | 9/2007 | Huberman et al. |
| 7,343,335 B1 | 3/2008 | Olliphant |
| 7,356,490 B1 | 4/2008 | Jacobi et al. |
| 7,360,080 B2 | 4/2008 | Camnisch et al. |
| 7,383,258 B2 | 6/2008 | Harik et al. |
| 7,433,832 B1 | 10/2008 | Bezos et al. |
| 7,433,876 B2 | 10/2008 | Spivack et al. |
| 7,478,078 B2 | 1/2009 | Lunt |
| 7,539,697 B1 | 5/2009 | Akella et al. |
| 2001/0011247 A1 | 8/2001 | O'Flaherty |
| 2002/0023230 A1 | 2/2002 | Bolnick |
| 2002/0059130 A1 | 5/2002 | Cheng et al. |
| 2002/0059201 A1 | 5/2002 | Work |
| 2002/0095465 A1 * | 7/2002 | Banks et al. ............ 709/206 |
| 2002/0103682 A1 | 8/2002 | Stemmer |
| 2002/0116458 A1 | 8/2002 | Bricklin |
| 2002/0116466 A1 | 8/2002 | Trevithick |
| 2002/0124053 A1 | 9/2002 | Adams |
| 2002/0143944 A1 | 10/2002 | Traversat |
| 2002/0169835 A1 | 11/2002 | Paul |
| 2002/0174073 A1 | 11/2002 | Nordman et al. |
| 2003/0020977 A1 | 1/2003 | Smith et al. |
| 2003/0050977 A1 | 3/2003 | Puthenkulam |
| 2003/0083898 A1 | 5/2003 | Wick |
| 2003/0101227 A1 | 5/2003 | Fink |
| 2003/0154213 A1 | 8/2003 | Ahn |
| 2003/0163530 A1 | 8/2003 | Ribak |
| 2003/0217151 A1 | 11/2003 | Roese et al. |
| 2003/0233650 A1 | 12/2003 | Zaner |
| 2004/0042599 A1 | 3/2004 | Zaner |
| 2004/0088325 A1 | 5/2004 | Elder |
| 2004/0093224 A1 | 5/2004 | Vanska |
| 2004/0122681 A1 | 6/2004 | Ruvolo et al. |
| 2004/0122803 A1 | 6/2004 | Dom |
| 2004/0162830 A1 | 8/2004 | Shirwadkar et al. |
| 2004/0167794 A1 | 8/2004 | Shostack |
| 2004/0172378 A1 | 9/2004 | Shanahan et al. |
| 2004/0193684 A1 | 9/2004 | Ben-Yoseph |
| 2004/0215793 A1 * | 10/2004 | Ryan et al. ............ 709/229 |
| 2004/0221309 A1 * | 11/2004 | Zaner et al. ............ 725/46 |
| 2004/0249811 A1 | 12/2004 | Shostack et al. |
| 2004/0260781 A1 | 12/2004 | Shostack et al. |
| 2005/0015432 A1 | 1/2005 | Cohen |
| 2005/0015457 A1 | 1/2005 | Warasawa |
| 2005/0050158 A1 | 3/2005 | Solari |
| 2005/0071741 A1 | 3/2005 | Acharya et al. |
| 2005/0120084 A1 | 6/2005 | Hu et al. |
| 2005/0154793 A1 * | 7/2005 | Khartabil ............ 709/227 |
| 2005/0159998 A1 | 7/2005 | Buyukkokten et al. |
| 2005/0165785 A1 | 7/2005 | Malkin et al. |
| 2005/0171832 A1 | 8/2005 | Hull et al. |
| 2005/0171954 A1 | 8/2005 | Hull et al. |
| 2005/0177599 A1 | 8/2005 | Goodman |
| 2005/0193054 A1 | 9/2005 | Wilson et al. |
| 2005/0197846 A1 | 9/2005 | Pezaris et al. |
| 2005/0198031 A1 | 9/2005 | Pezaris et al. |
| 2005/0209999 A1 | 9/2005 | Jou |
| 2005/0210409 A1 | 9/2005 | Jou |
| 2005/0216300 A1 | 9/2005 | Appelman et al. |
| 2005/0216550 A1 | 9/2005 | Paseman |
| 2005/0246420 A1 | 11/2005 | Little |
| 2005/0256866 A1 | 11/2005 | Lu et al. |
| 2005/0267766 A1 | 12/2005 | Galbreath et al. |
| 2006/0085259 A1 | 4/2006 | Nicholas |
| 2006/0136419 A1 | 6/2006 | Brydon et al. |
| 2006/0184997 A1 | 8/2006 | La Rotonda et al. |
| 2008/0133716 A1 | 6/2008 | Rao et al. |
| 2009/0013386 A1 | 1/2009 | Puthenkulam et al. |

FOREIGN PATENT DOCUMENTS

| | | |
|---|---|---|
| JP | 11265369 A | 9/1999 |
| JP | 2002132604 A | 10/2002 |
| WO | WO 00/68860 | 11/2000 |
| WO | WO 01/84266 | 11/2001 |
| WO | WO 2005/015470 A1 | 2/2005 |

OTHER PUBLICATIONS

Web Site, "About Multiply," http://multiply.com/info/about, printed May 3, 2004.

Web Slte, "Help" http://multiply.com/info/help, printed May 3, 2004.

Web Site, "Is Friendster the 'Next Big Thing'?" http://mobilemomentum.msn.com/article.aspx?aid=4, printed Mar. 25, 2004.

Web Site, "Multiply Privacy Policy," http://multiply.com/info/privacy, printed May 3, 2004.

Web Site, "Multiply Terms of Service," http://multiply.com/info/tos, printed May 3, 2004.

Web Site, "Running Notes From Revenge of the User: Lessons from Creator/User Battles," http://craphound.com/danahetcon04.txt, printed Jul. 28, 2004.

Jay Menna, "Phone Valet: Integrate your Phone with Mac OS X,O'Grady's PowerPage," http://www.powerpage.org/cgi-bin/WebObjects/powerpage.woa/wa/story?newsID=11803, Feb. 17, 2004.

Web Site, "Using AIM on Windows", http://www.aim.com/help_faq/using/win/away.adp?aolp=, Jul. 30, 2004.

Amazon.com, "Feedback FAQ," 3 pages, [online] [Retrieved on Jul. 29, 2004] Retrieved from the internet <URL:http://pages.amazon.com/execlobidos/tg/browse/-/1161284/qid=1 09111 0289/sr=1-1/002-2>.

Amazon.com, "How to Get a Great Feedback Score," 3 pages, [online] [Retrieved on Jul. 29, 2004] Retrieved from the internet <URL:http://pages.amazon.com/execlobidos/tg/browse/-/13107471/qid=1091110289/sr=1-5/002>.

Amazon.com, "New Seller FAQ," 3 pages, [online] [Retrieved on Jul. 29, 2004] Retrieved from the internet <URL:http://pages.amazon.com/execlobidos/tg/browse/-/1161274/002-2835726-5513622>.

Amazon.com, "Selling at Amazon Marketplace," 2 pages, [online] [Retrieved on Jul. 29, 2004] Retrieved from the internet <URL:http://pages.amazon.com/execlobidos/tg/browse/-/1161234/ref=hp_hp_ls_4_2/002-283572>.

Amazon.com, "Amazon.com Friends and Favorites," 6 pages, [online] [Retrieved on Feb. 27, 2004] Retrieved from the internet <URL:http://www.amazon.com/exec/obidos/subst/community/community-home.html/ref=pd_ys_...>.

Amazon.com. "Purchase Circles," 2 pages, [online] [Retrieved on Feb. 27, 2004] Retrieved from the internet <URL:http://www.amazon.com/exec/obidos/tg/browse/468604/ref=cm_pc_faq/002-0759267-82...>.

Amazon.com, "Wish Lists," 4 pages, [online] [Retrieved on Feb. 18, 2004] Retrieved from the internet <URL:http://www.amazon.com/exec/obidos/tg/browse/-/897204/ref=ya_hp_reg_1/002-9880811-...>.

Ebay.com, "Frequently Asked Questions," 4 pages, [online] [Retrieved on Jul. 29, 2004] Retrieved from the internet <URL:http://pages.ebay.com/help/basics/faq.html as available via the internet and printed on Jul. 29, 2004>.

Ebay.com, "How to Bid," 2 pages, [online] [Retrieved on Jul. 29, 2004] Retrieved from the internet <URL:http://pages.ebay.com/help/welcome/bid.html>.

Ebay.com, "How to Sell," 2 pages, [online] [Retrieved on Jul. 29, 2004] Retrieved from the internet <URL:http://pages.ebay.com/help/welcome/sell.html.

Ebay.com, "Star," 2 pages, [online] [Retrieved on Jul. 1, 2008] Retrieved from the internet <URL:http://pages.ebay.com/help/basics/g-stars.html>.

Ebay.com, "What is eBay?" 2 pages, [online] [Retrieved on Jul. 29, 2004] Retrieved from the internet <URL:http://pages.ebay.com/help/welcome/questions/about-ebay.html>.

Felicite.com, Wedding Registry & Gift Registry, Internet Archive Wayback Machine archived on May 30, 2003, 17 Pages, [online] [Retrieved on Feb. 2, 2007] Retrieved from the internet <URL:http://web.archive.org/web/20030530051929lhttp://www.felicite.com>.

"PlanetAll," From Internet Archive Wayback Machine on Nov. 1997, 19 pages, [online] [Retrieved on Mar. 17, 2004] Retrieved from the internet <URL: Internet Archive Wayback Machine: www.archive.org/www/planetall.com>.

Target, "Targetcom Wish List," 2 pages, [online] [Retrieved on Aug. 4, 2004] Retrieved from the internet <URL: http://www.target.com/gp/registry.html/ref=nav_t_gc/601-19177590687329?%5Fencoding=UTF8&type=wishlist>.

Iyer, S., "Accounts Website," 7 Pages, [online] [Retrieved on Jul. 29, 2004] Retrieved from the internet <URL:http://www.cs.rice.edu/-ssiyer/accounts/>.

Jensen, C., et al., "Finding Others Online: Reputation Systems for Social Online Spaces," Group Spaces, CHI 2002, Apr. 20-25, 2002, pp. 447-454, vol. 4, Iss. 1.

Kamvar, S., et al., "The EigenTrust Algorithm for Reputation Management in P2P Networks." International World Wide Web Conference Proceedings of the 12th Proceedings of the 12th ICWWW 2003, pp. 640-651.

Sulliven, D., "Is it really Personalized Search?" Search Engine Watch: Tips About Internet Search Engines & Search Engine Submission, SearchEngineWatch.com, May 2004, 5 Pages.

PCT International Search Report and Written Opinion, PCT/US2005/002240, Sep. 26, 2006, 5 Pages.

PCT International Search Report and Written Opinion, PCT/US2005/001544, Apr. 29, 2005, 9 Pages.

European Examination Report for European Patent Application EP 05722454.5, Feb. 8, 2007, 5 Pages.

Glance, N., et al., "Knowledge Pump: Community-centered Collaborative Filtering," Xerox Research Centre Europe, Grenoble Laboratory, Oct. 27, 1997, 5 Pages.

Balabanovic, M., et al., "Content-Based, Collaborative Recommendation," Mar. 1997, pp. 66-72, vol. 40, No. 3.

Kautz, H., et al., "ReferralWeb: Combining Social Networks and Collaborative Filtering," Communications of the ACM, Mar. 1997, 4 Pages, vol. 40, No. 3.

Lueg, C., "Considering Collaborative Filtering as Groupware: Experiences and Lessons Learned," Proceedings of the Second International Conference of Practical Aspects of Knowledge Management, 1998, pp. 16-1-16-6.

Resnick, P., et al., "Recommender Systems," Communications of the ACM, Mar. 1997, pp. 56-58, vol. 40, No. 3.

Rucker, J., et al., "Personalized Navigation for the Web," Communications of the ACM, Mar. 1997, pp. 73-75, vol. 40, No. 3.

Choi, J., "Netflix Prize for the best collaborative filtering algorithm," Data mining and parallelization, CGL Blog, Jul. 16, 2008, [online] [Retrieved on May 13, 2009] Retrieved from the internet <URL: http://jychoireport-cgl.blogspot.com/2008/07/netflix-prize-for-best-collaborative.html>.

"Collaborative filtering," Wikipedia, Last modified Oct. 17, 2007, [online] [Retrieved on May 13, 2009] Retrieved from the internet <URL:http://web.archive.org/web/20071020061658/http:/en.wikipedia.org/wiki/Collaborative_filtering>.

"Mufin.com: content-based recommendations," Net, Blogs and Rock'n'Roll, Oct. 8, 2008, [online] [Retrieved on May 13, 2009] Retrieved from the internet <URL: http://www.netblogsrocknroll.com/2008/10/mufin-music-fin.html>.

"Recommender system," Wikipedia, Last modified Jul. 27, 2009, [online] [Retrieved on Aug. 6, 2009] Retrieved from the internet <URL:http://en.wikipedia.org/wiki/Recommendation_system>.

Adamic, L., et al., "A social network caught in the Web", First Monday, 2003, pp. 1-22.

Decker, S., et al., "The Social Semantic Desktop", DERI Technical Report May 2, 2004, May 2004, 7 pages.

Eagle, N., et al., "Social Serendipity: Proximity Sensing and Cueing", MIT Media Laboratory Technical Note 580, May 2004, 18 pages.

Erickson, T., et al., "Social Translucence: Using Minimalist Visualizations of Social Activity to Support Collective Interaction", In Designing Information Spaces: The Social Navigation Approach (eds. K. Höök, D. Benyon, A Munroe), Springer-Verlag: London, 2003, pp. 17-41.

Lockheed-Martin Corporation "Battlefield awareness and data dissemination intelligent information dissemination server," AFRL-IF-RS-TR-1999-238, Final Technical Report, Nov. 1999, 31 pages.

Livejournal syndicated accounts (2004), last updated Jan. 6, 2004, can be retrieved at <URL:http://www.livejournal.com/syn/>, 2 pages.

NomadNet, "NomadNet News," web page at <URL:http://www.netnomad.com/> available via the Internet and printed Dec. 1, 2004, 12 pages.

Ofoto, "Ofoto Share Albums," web page at <URL:http://www.ofoto.com/ShareOverview.jsp?UV=363085663086_78428514107> as available via the Internet and printed Dec. 1, 2004, 2 pages.

Online Business Network, "Social Networking Site Guide-Ryze," web page at <URL:http://www.onlinebusinessnetworks.comlonline-social-networks-guide/ryze>, as available via the Internet and printed Dec. 1, 2004, 8 pages.

PC World, "PCWorld-ICQ Builds a Social Network," web page at <URL:http://www.pcworld.com/news/articleIO.aid.115084.OO.asp>, as available via the Internet and printed Dec. 1, 2004, 5 pages.

Petersen's Photographic, "My Photos at Photographic," web page at <URL:http://rnyphotos.photographic.com/>, as available via the Internet and printed Dec. 1, 2004, 19 pages.

PictureDot, "CactusVision WebCam from PictureDot.com-Broadcast your live webcam now, FREE!" web page at <URL:http://www.picturedot.com?CactusVision_WebCam_Info.asp>, as available via the Internetand printed Dec. 1, 2004, 2 pages.

SAE International, "Why should I register to use the SAE website?" web page at <URL:http:my.sae.org/whyregister.htm>, as available via the Internet and printed Dec. 1, 2004, 1 page.

Theme your Desktop, "Free Webcam Thumbnails on your Desktop-Any webcam.com," web page At <URL:http://themes.anywebcam.comJdesktop/desktop.html> as available via the Internet and printed Nov. 2005 Dec. 1, 2004, 3 pages.

Westlaw, "WestClip", 2004, web page at <URL:http://west.thomson.com/westlaw/westclip>, as available via the Internet and printed Jul. 28, 2004, 3 pages.

Yahoo!, "Introducing RSS Headlines," web page at <URL:http://e.my.yahoo.com/config/promo content?.module=ycontent>, as available via the Internet and printed Jun. 18,2004, 1 page.

Yahoo!, "Yahoo! Chat," web page at <URL:http://chat.yahoo.com/>, as available via the Internet and printed Dec. 1, 2004, 1 page.

Yahoo!, "Yahoo! Help-Yahoo! GeoCities Tour," web page at <URL:http://help.yahoo.com/help/us/geo/tour/tour-01.html>, as available via the Internet and printed Dec. 1, 2004, 20 pages.

Yahoo! Groups, "Customize LostDrive-ln," web page at <URL:http://groups.yahoo.com/groups/lostdrivein/confwiz>, as available via the Internet and printed Jun. 2, 2004, 10 pages.

Avery, C., et al., "Recommender Systems for Evaluating Computer Messages," Communications of the ACM, Mar. 1997, pp. 88-89, vol. 40, No. 3.

Konstan, J., et al., "Applying Collaborative Filinger to Usenet News," Communications of the ACM, Mar. 1997, pp. 77-87, vol. 40, No. 3.

Google, Inc., "Google Answers," Google, 2004, 1 page, [online] [retrieved on Jul. 29, 2004] retrieved from the internet <URL:http://answers.google.com/answers/>.

Google, Inc., "Google Answers: Frequently Asked Questions," Google, 2003, 9 pages, [online] [retrieved on Jul. 29, 2004] retrieved from the internet <URL:http://answers.google.com/answers/faq.html>.

Yahoo! Inc., "Yahoo! Groups," Yahoo! Inc., 2004, 2 pages, [online] [retrieved on Jul. 29, 2004] retrieved from the internet <URL:http://groups.yahoo.com>.

Yahoo! Inc., "Yahoo! Help—Groups," Yahoo! Inc., 2004, 12 pages, [online] [retrieved on Jul. 29, 2004] retrieved from the internet <URL:http://help.yahoo.com/help/us/groups/groups-01.html>.

Yahoo! Inc., "Yahoo! Help—Groups Database," Yahoo! Inc., 2004, 9 pages, [online] [retrieved on Jul. 29, 2004] retrieved from the internet <URL:http://help.yahoo.com/help/us/groups/database>.

* cited by examiner

SYSTEMS AND METHODS FOR INDICATING A USER STATE IN A SOCIAL NETWORK

FIELD OF THE INVENTION

The invention generally relates to social networks. More particularly, the invention relates to systems and methods for indicating a user state in a social network.

BACKGROUND

Conventional messaging applications or social networks allow users to send messages to each other and such conventional applications and networks can indicate whether a member is logged on to the network or messaging application. The abilities of existing social networks and messaging applications are limited however. Members typically cannot, for example, use conventional messaging applications or social networks to keep detailed, up-to-date information regarding user states to facilitate communication with other members.

SUMMARY

Embodiments of the present invention comprise systems and methods for indicating a user state for a member of a social network. According to one embodiment, a method comprises comprising receiving in a network of associated users user state information for a first user, wherein the network of associated users comprises user established relationships between users, determining a current user state for the first user; and outputting to a second user the user state information based at least in part on the current user state and a relationship based permission status.

This exemplary embodiment is mentioned not to limit or define the invention, but to provide one example of one embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

The present invention comprises methods and systems for determining a user state for a member of a social network. There are multiple embodiments of the present invention. By way of introduction and example, one exemplary embodiment of the present invention, provides a method for determining availability status and contact information for a user of a social network. For example, one embodiment allows a member to define user states that describe, for example, one or a combination of activity status, contact information, location, and other relevant information about the member. Other members desiring to contact or know the status of the member can then receive, for example, the user state information. Receiving the user state information can be limited to certain levels of types or associations or other permission restrictions set by the member.

A social network can refer to a computer network connecting people or organizations by a set of social relationships, such as friendship, co-working, or information exchange. Examples of social networks include services such as Orkut.com, Friendster.com, and tribe.net, for example.

System Architecture

Figure 1:
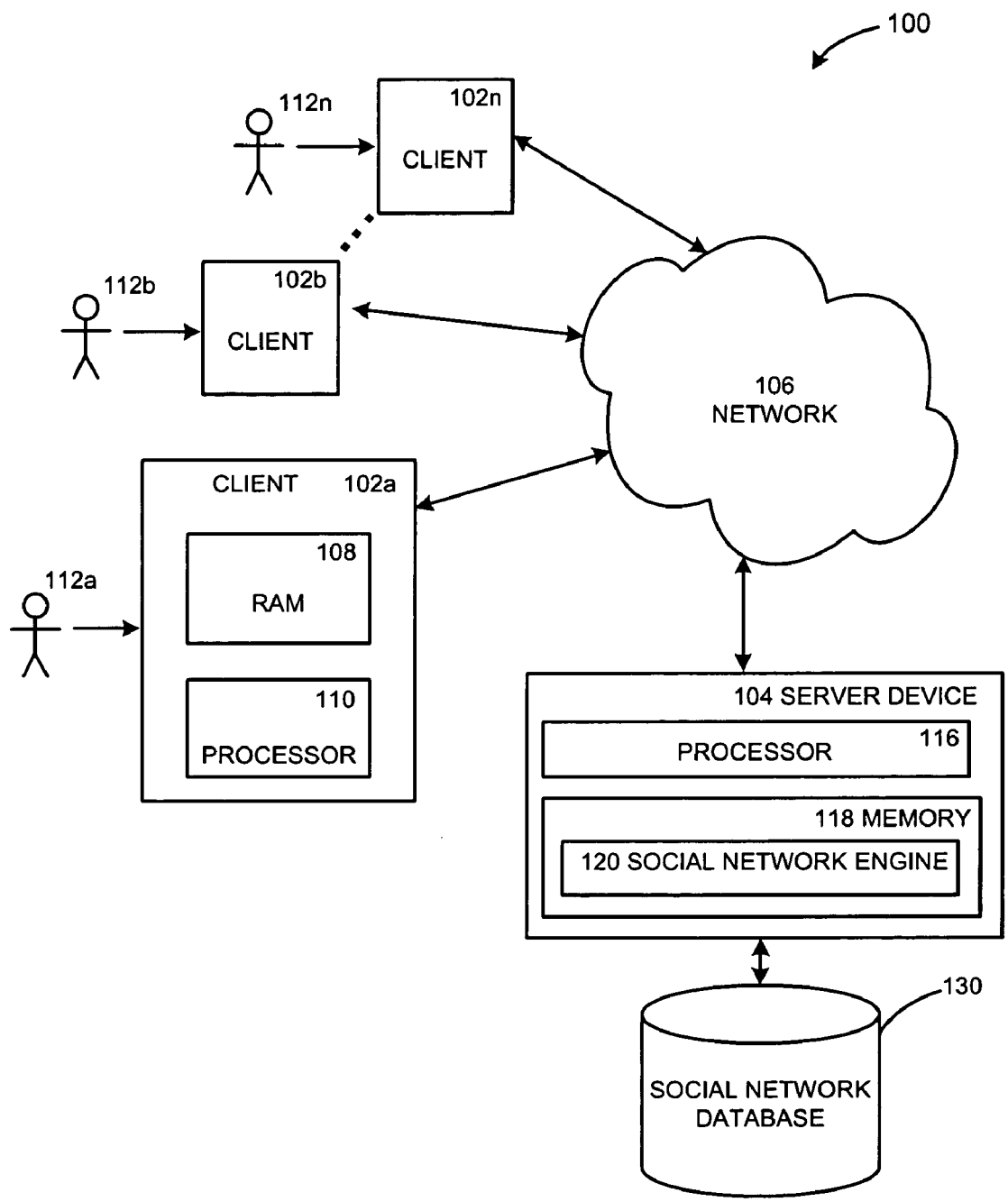
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102*a-n* may operate on any operating system capable of supporting a browser or browser-enabled application, such as Microsoft® Windows® or Linux. The client devices 102*a-n* shown include, for example, personal computers executing a browser application program such as Microsoft Corporation's Internet Explorer™, Netscape Communication Corporation's Netscape Navigator™, and Apple Computer, Inc.'s Safari™.

Through the client devices 102*a-n*, users 112*a-n* can communicate over the network 106 with each other and with other systems and devices coupled to the network 106. As shown in FIG. 1, a server device 104 is also coupled to the network 106. The server device 104 shown comprises a server executing a social network engine application program. Similar to the client devices 102*a-n*, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains a social network engine application program, also known as a social network engine 120. The social network engine 120 allows users, such as user 112*a*, to interact with and participate in a social network. A social network can refer to a computer network connecting people or organizations by a set of social relationships, such as friendship, co-working, or information exchange. A social network can comprise profiles that can be associated with other profiles. Each profile may represent a member, and a member can be an entity such as, for example, a person, an organization, a business, a corporation, a community, a fictitious person, or other entity. Each profile can contain entries, and each entry can comprise information associated with a profile. Examples of entries for a person profile can comprise contact information such as an email addresses, mailing address, IM name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information describing, identifying, or otherwise associated with a profile. Entries for a business profile can comprise industry information such as market sector, customer base, location, or supplier information; financial information such as net profits, net worth, number of employees, stock performance; or other types of information associated with the business profile.

Additionally, entries within a profile can comprise associations with other profiles. Associations between profiles within a social network can include, for example, friendships, business relationships, acquaintances, community associations, activity partner associations, common interest associations, common characteristic associations, or any other suitable type of social relationship connection. Associations between profiles can also have various levels. For example, friendship levels can include, for example, a "haven't met" level, an "acquaintance" level, a "friend" level, a "good friend" level, a "best friend" level, and other suitable levels.

A degree of separation based on associations between profiles can also be determined. For example, a degree of separation can be determined based on the fewest number of associations between two profiles. Thus, if profile A is a friend of profile B, and profile B is a friend of profile C, there can be a degree of separation of two between profile A and C. A degree of separation can be type specific or type neutral. Type specific degrees of separation only count relationships of a certain type. Thus, for example, in the case above where A is a friend of B, and B is a friend of C, there is a friendship degree of separation of two, even if A is directly associated with C by a business association, which would otherwise produce a degree of separation of 1.

Moreover, profiles can comprise user states. User states can comprise user state information, including, for example, an activity status, location status, availability status, contact information, or other user state information for a member of the social network. Activity status can include, for example, a type of activity or activities the member is engaged in or interested in. For example, an activity status "working" can indicate that the member is working. Additionally, an activity status "recreation" can indicate the member is involved in recreation or is looking for recreational activity. Location status can include, for example, information relating to where the member is located. For example, an "office" location status can indicate that the member is at an office location. Likewise, a "home" location status can indicate that the member is at home. An availability status can include, for example, information relating to whether the member can or wants to be contacted. For example, an "unavailable" availability status can indicate that member does not want to be contacted. The availability status can be specific for different types or levels or degrees of association. Thus, an activity status can indicate that the member is available to best friends, or to friends of best friends, but not to anyone else. Different types of user state information can be combined into one state. For example, the working activity status and "office" location status above can be combined into a "work" user state. The "work" user state can further include the availability of the member and other suitable user state information. Contact information for the member can comprise, for example, an email address and telephone number, an instant messaging user name, or other suitable contact information. Thus, for example, a work user state for a first member of the social network can be associated with a work telephone number and a work email address for the first member. A second member of the social network, who desires to contact the first member, can retrieve output identifying the first member's user state and, based on the first member's user state, a preferred contact method can be determined by the social network engine 120 and output to the second member. These types of user state information are listed as examples and are not exhaustive. Other types of user state information can be used within the scope of various embodiments of the method 300 described below.

The social network engine 120 can further determine a current user state associated with a member's profile. The current user state can comprise, for example, a user state that is associated with a current activity or location of a member of the social network. For example, when a member of the social network is at home, the member's current user state can be a "home" user state. The social network engine 120 can update the current user state based, for example, on a schedule entered by a member, a manual indication from the member, an IP address, information from a client device, or other suitable signals. The social network engine 120 can then use the current user state to facilitate communication between the member and other members of the social network. For example, three user states can exist for a first member of the social network. The first user state can be a work user state associated with a work email address. The second user state can be a commuting user state associated with a mobile phone number, and the third user state can be a home user state associated with an instant messaging user name. The member of the social network can then enter a schedule indicating, for example, that the member's current user state should reflect a work user state from 8:00 a.m. until 5:00 p.m., a commuting user state from 5:00 p.m. until 6:00 p.m., and a home user state from 6:00 p.m. until 7:00 a.m. A second member attempting to contact the first member can then be notified of the current user's state of the first member and receive the preferred contact method associated with that current user state. For example, the second member of the social network can attempt to contact the first member of the social network at 5:30 p.m. The second member can be notified that the first member's user state is a commuting user state and can be notified that the preferred contact method is a mobile phone number. The second member can then receive from the social network engine the mobile phone number of the first network member.

Server device 104 also provides access to storage elements, such as a social network storage element, in the example shown in FIG. 1, a social network database 130. The social network database 130 can be used to store profiles and to store communities created by the community processor 124. Data storage elements may include any one or combination of methods for storing data, including without limitation, arrays, hash tables, lists, and pairs. Other similar types of data storage devices can be accessed by the server device 104. The social network engine 120 can receive data comprising the profiles and communities from the social network database 130 and can also send data comprising communities and profiles to the social network database 130 for storage. The social network database 130 may be physically attached or otherwise in communication with the social network engine 120 by way of a network or other connection.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the methods illustrated in FIGS. 2-3.

Exemplary Social Network

Figure 2:
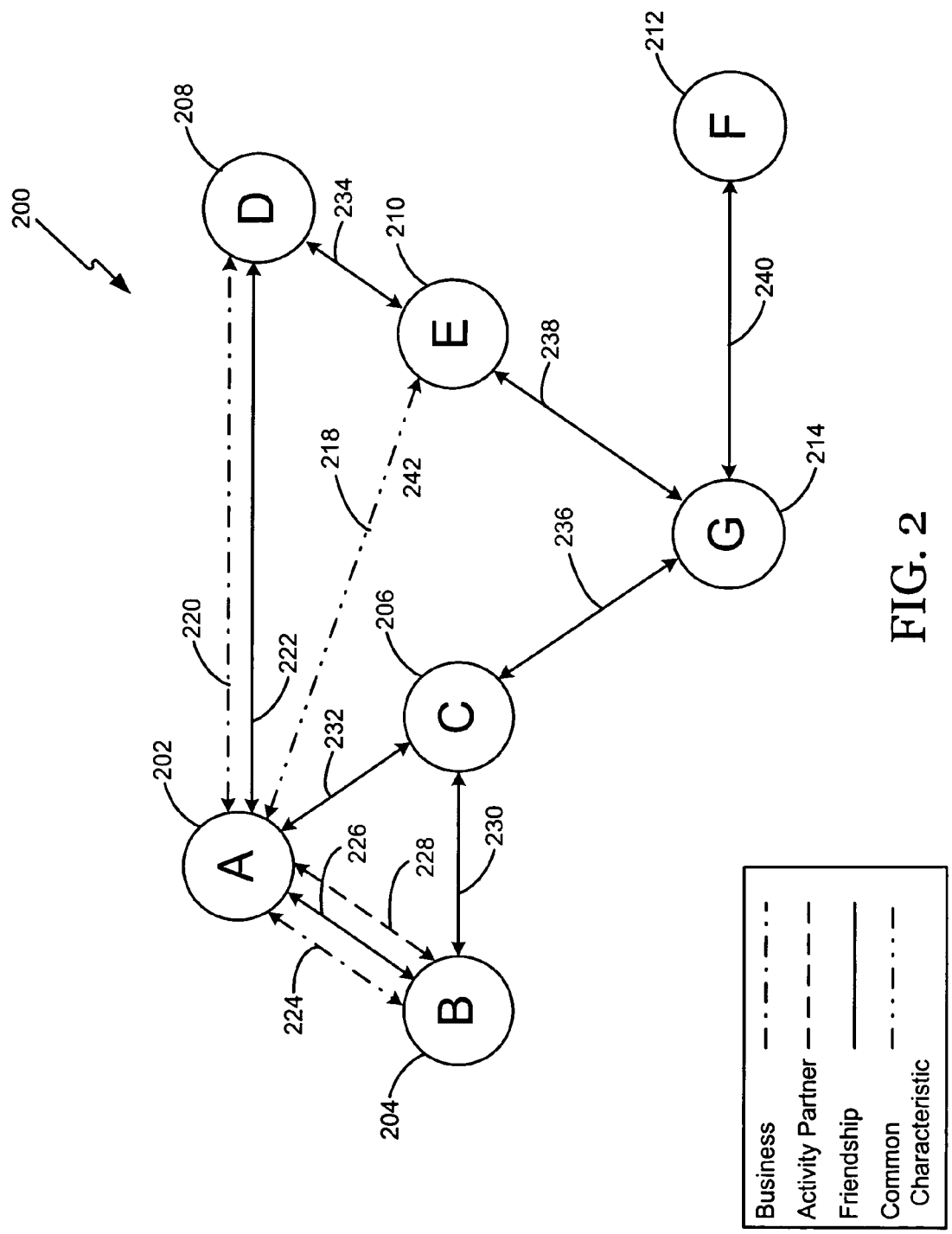
FIG. 2 illustrates a diagram of an exemplary social network in accordance with one embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the social network 200. According to another embodiment, one or more of the vertices can represent a community. The methods and systems discussed below are equally applicable to an embodiment where the vertices comprise one or more communities, but for purposes of illustration, the vertices depicted in FIG. 2 represent member profiles. The exemplary network 200 shown in FIG. 2 has seven members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's social network member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that can be recorded in the member's profile. According to one embodiment, relationships can be established by an invitation and an acceptance of the invitation. For example, a first user can send an invitation to a second user inviting the second user to form a relationship with the first user. The second user can accept or reject the invitation. According to one embodiment, if the second user rejects the invitation, a one-way relationship can be formed between the first user and the second user. According to another embodiment, if the second user rejects the relationship, no relationship may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, can be referred to as user established relationships.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, 234, 236, 238 and 240 shown comprise associations between profiles. According to the embodiment shown in FIG. 2, the social network 200 comprises a plurality of differing types of associations represented by edges 218, 220, 222, 224, 226, 228, 230, 232, 234, 236, 238 and 240. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, 234, 236, 238, and 240 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends can include profile B, but a display of profile B's friends would not include profile A.

According to another embodiment, a directed or single direction association can be formed when one member indicates a relationship with a second member but the second member does not reciprocate the relationship. For example, a member associated with profile A can indicate that he is a friend of a member associated with profile B. The member associated with profile B in this example can decide not to indicate that the member associated with profile A is a friend. According to one embodiment, profile B would not be displayed with profile A's friends nor would profile A be displayed with profile B's friends as the relationship was not reciprocated by profile B. Similarly, profile B may not be included, for example, within a listing of friends of profile A for purposes of determining degrees of separation, for example. Thus, in such an embodiment, the displaying of profile B can be controlled by the relationships the member associated with profile B assents to.

Within a social network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example can be that profile A attended the same high school as profile E. A common characteristic association may be selected by profiles A and E to represent that they are associated in some fashion, but to not create a close association, such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each association and a corresponding weighting factor prior to summing the associations. Thus, highly weighted associations would contribute less to the resulting sum than lower weighted associations.

Processes

Various methods in accordance with the present invention may be carried out. For example, in one embodiment, a method comprises receiving in a network of associated users a user state associated with a member of the network of associated users, the user state comprising user state information entered by the member; determining a current user state for the member; and outputting the user state information based at least in part on the current user state. According to one embodiment, receiving the user state can comprise receiving one or more of activity information, location information, availability status, contact information, or custom information. According to another embodiment, receiving a user state can comprise outputting a user interface, such as a graphical user interface for example, or a template. According to another embodiment, determining a current user state can comprise one or more of determining a schedule, receiving a manual indication, identifying an IP address, determining a geographical location, receiving a GPS signal, mobile phone triangulation, or receiving information from a client device. According to another embodiment, identifying the IP address can comprise associating an IP address with a geographical location. According to another embodiment, receiving information from a client device can comprise receiving a cookie.

According to another embodiment, outputting user state information can comprise outputting one or more of contact information, location information, availability status information, activity status information, or custom information. According to another embodiment, outputting user state information can be in response to an implicit or explicit query or as part of a social network interface. According to another embodiment, the user state information can be output together with a picture associated with a profile. According to another embodiment, outputting user state information can comprise determining a degree of separation, a relationship type, or a relationship level. According to another embodiment, outputting user state information can comprise outputting user state information using one or more of email, instant messaging, telephone, or mailing address. According to another embodiment, outputting the use state can comprise initiating a telephone call.

Figure 3:
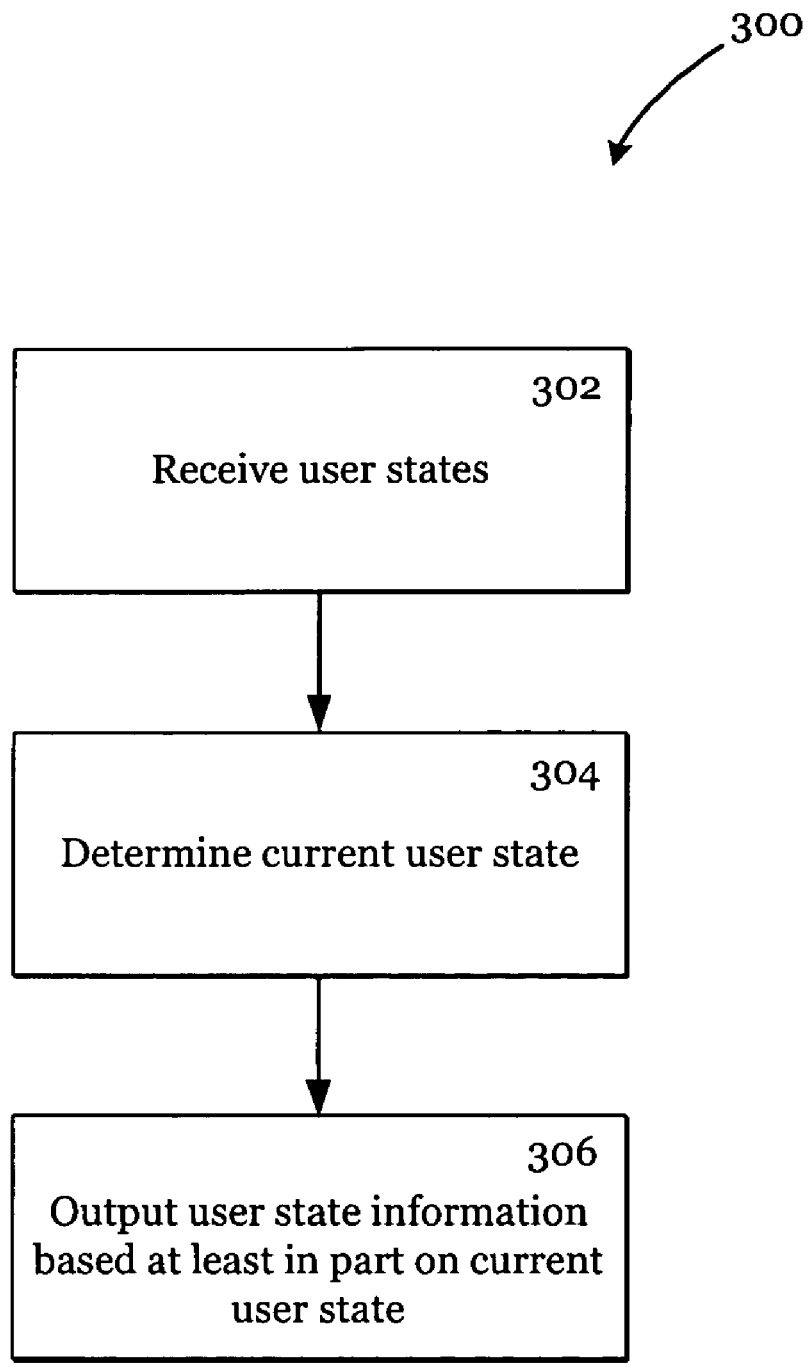
FIG. 3 illustrates a method in accordance with one embodiment of the present invention.

FIG. 3 illustrates an exemplary method 300 in accordance with one embodiment of the present invention. This exemplary method is provided by way of example, as it will be appreciated from the foregoing description of exemplary embodiments there are a variety of ways to carry out methods in other embodiments of the present invention. The method 300 shown in FIG. 3 can be executed or otherwise performed by any of various systems. The method 300 is described below as carried out by the system 100 shown in FIG. 1 by way of example, and various elements of the system 100 are referenced in explaining the example method of FIG. 3.

The method 300 shown provides a method for determining a user state for a member of a social network. The method 300 begins in block 302 wherein the social network search engine receives a user state from the user 112a. Receiving a user state can comprise, for example, receiving input from the user 112a defining content for a user state. The social network engine 120 can receive input, for example, by presenting an interface to the user 112a, or by monitoring input from the user 112a. For example, according to one embodiment, the social network engine 120 can cause the output of a user interface that allows the user 112a to define user states. The user interface can prompt for such information as a name of a user state, such as "work" or "home;" location information for the user state, such as an office address or a home address; availability information such as "available to friends" or "not available;" contact information, such as a phone number or email address; or any other suitable information defining a user state. Thus, the user 112a can use the user interface to enter a work address, a work telephone number, a work schedule, and a preferred contact method, including, for example, a work email address to define a work user state.

User states may also be created based on templates. Templates can include, for example, common user states with suggested types of user state information. For example, the social network engine 120 can present a user with a template for a home user state that prompts the user for a home address, home availability status, and home contact information. Thus, for example, the social network engine can prompt for a variety of common user states and thus allow the creation of multiple user states for the user 112a without a lot of cognitive effort on the part of the user 112a. The social network engine can have default prompts, for example, for a home, work, and recreation user state.

Alternatively, users can create their own custom user states. Custom user states can comprise, for example, a user state defined for a unique activity or state of a member of the social network. Custom user states can comprise any type of information defined by the user 112a and can thus be tailored to specific interests of the user 112a. For example, the user 112a can have an interest in water skiing and, for example, create a water skiing user state that indicates which lake the user 112a is on, whether the user 112a would like additional members to join him, whether the member is wake boarding or slalom skiing, and a time to meet on the lake. Members can use the user states, for example, to facilitate communication or activities with other members of the social network. Thus, in the previous example, the user 112a can use the water skiing user state to let his friends know he is water skiing and invite those who are interested to join him.

Once user states are received by the social network engine 120, the method 300 proceeds to block 304, wherein the social network engine 120 determines a current user state. Determining a current user state can comprise, for example, determining a schedule for a member of the social network, receiving a manual indication from the member, determining a geographical location for a member, receiving an IP address associated with the member, receiving information from a client device associated with the member, or other suitable indications of the member's activity, location or status. Receiving a manual indication can comprise, for example, presenting to the member a user interface or other suitable interface displaying multiple possible use states and monitoring a selection made by the member, for example, by clicking on a desired current user state. For example, the social network engine 120 can cause the member to be presented with an icon representing a home use state, a work user state, and a commuting user state. The member can then use an input device, such as a mouse for example, to select the icon corresponding to the member's current user state. Thus, for example, when the member arrives at work he can select the work user state, when he leaves work he can select the commuting user state, and when he arrives home he can select the home user state. Determining a geographical location associated with a user can comprise, for example determining a position based on triangulation of a signal from a mobile phone or other similar device, from receiving a signal from a Global Positioning System (GPS) device, or receiving an IP address for a member. Determining a position based on triangulation of signals can comprise determining a distance from a source signal to each of three or more locations based on the speed of the signal and the elapsed time from when the signal was sent to when the signal is received. Determining a position based on a signal from a GPS device can comprise receiving, for example, a longitude and a latitude coordinate determined from signals received from multiple satellites by a GPS capable unit. The geographical location determined by triangulation or GPS signals can then be compared by the social network engine 120 to a location associated with a user state.

Receiving an IP address from a member can comprise, for example, receiving a request signal associated with the member, identifying an IP address for the request signal and, determining a geographical location associated with the IP address. For example, the social network engine 120 can receive a login request from the member while the member is at work, for example. The search engine can identify the member based, for example, on login information entered by the member and can identify the IP address of the incoming login request. The social network engine 120 can then determine a geographical location associated with the IP address, for example, by looking up the IP address in a table listing IP addresses and corresponding geographical locations. The social network engine 120 can match the geographical location with, for example, a work address within the member's work user state. Based on the geographical location association with the IP address and the work address, the social network engine 120 can determine a work user state as the current user state of the user 112a. The user 112a can then go home and log in again to the social network. The user's 112a IP address can now reflect a different geographical location, which the social network engine 120 can match with a home address contained in a home user state associated with the member. The social network engine 120 can update the current user state of the user 112a to a home user state based on the match between the geographical location associated with the IP address and the home address.

Receiving information from a client device associated with the member can comprise, for example, receiving a packet, such as a cookie for example, and identifying a client device and an associated member of the social network based on the packet. For example, the social network engine 120 can receive a packet of information from a web browser application on a work computer for the member of the social network. The packet of information can identify the work computer and can identify the name of the member of the social network. The social network engine can then determine a user state associated with the client device, for example, a work user state. The social network engine can determine a user state associated with the client device based, for example, on an explicit association made by the member, or a history of user states associated with the client device. For example, the member can explicitly identify a work use state corresponding to the work client device, for example. Alternatively, the social network engine 120 can identify a previous user state entered by the member on a particular client and associate future activity on the particular client with the previous user state. For example, the member can logon to the social network from the work client device and indicate a work user state. On subsequent logons, the social network engine 120 can receive a cookie from a web browser application and can recall the work user state, even if the member does not actively indicate a user state explicitly.

Receiving information from a client device associated with the member can further comprise detecting activity on a client device. For example, the social network engine 120 can receive a signal indicating when the user 112a moves a mouse, opens an application, or conducts other activity on the client device 102a. Additionally, the social network engine can detect when the client device 102a enters a suspend mode or is shut down for example. This information can be used by the social network engine 120 to determine whether a member is currently online for example, or whether a member is currently available or unavailable at a location associated with the client device.

Once the social network engine 120 determines a current user state, the method 300 proceeds to block 306, wherein the social network engine 120 outputs user state information based at least in part on the current user state. Outputting user state information based at least in part on the current user state can comprise outputting contact information, location status information, availability information, activity status information, or custom information comprising the current user state of a member of the social network. The contact information can include, for example, an email address, a telephone number, an instant messaging user name, a mailing address, or any other suitable contact information comprising the current user state of the member of the social network. Location status information can comprise, for example, a specific address or a general area identifying a location associated with the current user state of the member. For example, the user can indicate a specific work address for a work user state, or could identify a general area, such as a hometown for a recreational user state. The social network engine 120 can then return either the specific address or the general location information based on the current user state of the member. Availability information can include, for example, whether a member is available for contact as defined by the current user state. Thus, for example, a member of the social network can indicate an unavailable status for a home user state and an available status for a work user state, and the social network engine 120 can output the availability information based on the current user state of the member of the social network. Activity status information can comprise, for example, a specific type of activity or general category of activity associated with the user state. For example, a user state can indicate a general category of activity, such as working, or can comprise a specific activity status, such as water skiing on Lake Powell.

Custom information can include any additional entries within a user state. For example, custom information can include what a member is wearing, how much a member enjoys the activity associated with the current user state, what kind of music the member is listening to, what sort of mood the member is in, whether the member desires activity partners, or any other suitable information associated with a customized user state for a member of the social network.

Outputting user state information can occur in response to a query entered by the user 112a. For example, the user 112a can log on to a social network and explicitly request the user state of a member of the social network, for example, by typing the name of the member into a search field. Or, alternatively, a query can be based on an implicit query generated by an application of the client device 102a. Thus, for example, if the user 112a is typing an email on the client device 102a, an application on the client device 102a can capture a name contained within the email and send the name to the social network engine 120, which can return user state information for a member associated with the name. Additionally, user state information can be output as part of the social network interface presented by the social network engine 120 to the user 112a. For example, the user 112a can log on to the social network and be presented with a user interface identifying profile information associated with friends of the user 112a. The profile information for the friends of the user 112a can comprise, for example, a picture, a name, and a user state.

The output of user state information of the social network 120 can be based on a relationship based permission status. A relationship based permission status can comprise restrictions on outputting user state information based on relationship type, relationship level, degree of separation, or other suitable qualifying characteristics. For example, a member of the social network can indicate that only friends, or friends of friends, have permission to view the member's user state. The social network 120 can then selectively output user state information for the member only to qualifying friends or friends of friends. Qualifications based on relationship status can include, for example, a type of relationship, such as a haven't met level, an acquaintance level, a friend level, a good friend level, or a best friend level. A member of the social network can indicate that only good friends and best friends are permitted to view the member's user state information.

Qualifications based on relationship type can include, for example, permission based on whether an association is a friendship association, a business relationship association, an acquaintance association, a community association, an activity partner association or any other type of association. For example, the social network engine 120 can allow a user to indicate that only business relationship associations are permitted to view the member's work user state. Additionally, the social network engine 120 can allow the member to restrict access to the member's home user state information or recreational user state information to friendship associations or activity partner associations. A degree of separation qualification can comprise, for example, a permission status based on the number of associations separating a member of the social network from another member of the social network. For example, a member of the social network can indicate that only members separated by fewer than two degrees of separation can be permitted to view user state information for the member. For example, the social network 120 can enable the user 112a to indicate that only friends and friends of friends can view the user state information for the member and exclude friends of friends of friends.

The social network engine 120 can output user state information by displaying or presenting the user state information within a social network interface, by sending an email message, by sending an instant messaging message, by placing a telephone call, or by another suitable method of communication. For example, the social network engine 120 can output user state information together with a picture of a profile on a social network interface. Or, for example, the social network 120 can send an email message to a member of the social network who has requested the user state information for another member. The social network engine 120 can also use instant messaging dialogue to communicate the user state information for members of the social network. For example, if a first member of the social network is chatting with a second member of the social network using an instant messaging application, the social network 120 can monitor a conversation between the first member in the social network and the second member of the social network, and also monitor the current user state of the first member and the second member. The search engine 120 can further notify, for example, the first member when the current user state of the second member changes. Thus, for example, if the second member logs on from a different client device, the social network engine 120 can update the current user state of the second member and notify the first member via the instant messaging application that the user state of the current user state of the second member has changed, and can supply the first member with a new preferred contact method, for example, for contacting the second member of the social network.

Moreover, the social network engine 120 can receive a request from a first member of the social network to contact a second member of the social network and can identify, for example, that the preferred contact method for the second member of the social network is a telephone number. The social network engine 120 can present the telephone number to the first member of the social network or, alternatively, can proceed to initiate a telephone call between the first member of the social and the second member of the social network based on the telephone number of the preferred contact method for the second member and a telephone number associated with the current user state of the first member. Thus, for example, if the first member of the social network is at home and has indicated a home telephone number associated with a home user state, and the second member is at work and has indicated a work telephone number associated with a work user state, the social network engine 120 can initiate a telephone call from the home telephone number of the first member to the work telephone number of the second member.

General

While the above description contains many specifics, these specifics should not be construed as limitations on the scope of the invention, but merely as exemplifications of the disclosed embodiments. Those skilled in the art will envision any other possible variations that are within the scope of the invention.

The invention claimed is:

1. A method, comprising:
   receiving in a social network personal state information for a first person, wherein the social network comprises user-established relationships between users and the personal state information comprises activity information provided by the first person;
   determining a current personal state for the first person based on the personal state information; and outputting to a second person an availability status, wherein the availability status indicates whether the first person is available to communicate with the second person and is based at least in part on the current personal state and a permission status based on the user-established relationship between the first person and the second person and wherein outputting the availability status comprises determining a relationship type and a relationship level of the user-established relationship between the first person and the second person and selectively outputting the availability status to the second person based at least in part on the relationship type and the relationship level.

2. The method of claim 1, wherein the personal state information comprises one or more of location information, availability status, contact information, and custom information.

3. The method of claim 1, wherein receiving personal state information comprises receiving input specified by the first person from a user interface.

4. The method of claim 1, wherein receiving personal state information comprises receiving input specified by the first person from a template.

5. The method of claim 1, wherein determining a current personal state comprises one or more of determining a schedule, receiving a manual indication, and receiving information from a client device.

6. The method of claim 1, wherein determining a current personal state comprises determining an IP address and associating the IP address with a geographical location.

7. The method of claim 1, wherein determining a current personal state comprises determining a geographical location based on triangulation of a signal from a mobile phone.

8. The method of claim 1, wherein determining a current personal state comprises determining a geographical location by receiving a signal from a Global Positioning System device.

9. The method of claim 5, wherein receiving information from a client device comprises receiving a cookie.

10. The method of claim 1, further comprising outputting to the second person one or more of contact information, location information, activity status information and custom information.

11. The method of claim 1, wherein outputting the availability status is done in response to a query.

12. The method of claim 11, wherein the query is an explicit query.

13. The method of claim 11, wherein the query is an implicit query.

14. The method of claim 1, wherein outputting to a second person the availability status based on the user-established relationship between the first person and the second person further comprises determining a degree of separation between the first person and the second person and selectively outputting the availability status to the second user based at least in part on the degree of separation.

15. The method of claim 1, wherein outputting the availability status comprises outputting the availability status within a website that provides an interface to the social network.

16. The method of claim 15, wherein the availability status is output with a picture associated with the first person.

17. The method of claim 1, further comprising outputting the availability status via one or more of email, instant messaging, telephone, and mailing address.

18. The method of claim 17, wherein outputting the availability status comprises initiating a telephone call.

19. A non-transitory computer-readable medium containing program code comprising:
  program code for receiving in a social network personal state information for a first person, wherein the social network comprises user-established relationships between users and the personal state information comprises activity information provided by the first person;
  program code for determining a current personal state for the first person based on the personal state information; and
  program code for outputting to a second person an availability status, wherein the availability status indicates whether the first person is available to communicate with the second person and is based at least in part on the current personal state and a permission status based on the user-established relationship between the first person and the second person and wherein outputting the availability status comprises determining a relationship type and a relationship level of the user-established relationship between the first person and the second person and selectively outputting the availability status to the second person based at least in part on the relationship type and the relationship level.

20. The non-transitory computer-readable medium of claim 19, wherein the personal state information comprises one or more of location information, availability status, contact information, and custom information.

21. The non-transitory computer-readable medium of claim 19, wherein receiving personal state information comprises receiving input specified by the first person from a user interface.

22. The non-transitory computer-readable medium of claim 19, wherein receiving personal state information comprises receiving input specified by the first person from a template.

23. The non-transitory computer-readable medium of claim 19, wherein determining a current personal state comprises one or more of determining a schedule, receiving a manual indication, and receiving information from a client device.

24. The non-transitory computer-readable medium of claim 19, wherein determining a current personal state comprises determining an IP address and associating the IP address with a geographical location.

25. The non-transitory computer-readable medium of claim 19, wherein determining a current personal state comprises determining a geographical location based on triangulation of a signal from a mobile phone.

26. The non-transitory computer-readable medium of claim 19, wherein determining a current personal state comprises determining a geographical location by receiving a signal from a Global Positioning System device.

27. The non-transitory computer-readable medium of claim 23, wherein receiving information from a client device comprises receiving a cookie.

28. The non-transitory computer-readable medium of claim 19, further comprising outputting to a second person one or more of contact information, location information, activity status information and custom information.

29. The non-transitory computer-readable medium of claim 19, wherein outputting the availability status is done in response to a query.

30. The non-transitory computer-readable medium of claim 29, wherein the query is an explicit query.

31. The non-transitory computer-readable medium of claim 29, wherein the query is an implicit query.

32. The non-transitory computer-readable medium of claim 19, wherein outputting to a second person the availability status based on the user-established relationship between the first person and the second person further comprises determining a degree of separation between the first person and the second person and selectively outputting the availability status to the second user based at least in part on the degree of separation.

33. The non-transitory computer-readable medium of claim 19, wherein outputting the availability status comprises outputting the availability status within a website that provides an interface to the social network.

34. The non-transitory computer-readable medium of claim 33, wherein the availability status is output with a picture associated with the first person.

35. The non-transitory computer-readable medium of claim 19, further comprising outputting availability status via one or more of email, instant messaging, telephone, and mailing address.

36. The non-transitory computer-readable medium of claim 35, wherein outputting the availability status comprises initiating a telephone call.

* * * * *